(No Model.)

H. P. KENT.
CHECK REIN CLASP.

No. 316,370. Patented Apr. 21, 1885.

WITNESSES:
Chas. F. Schmelz
Leonard Scholfield

INVENTOR:
Haxham P. Kent
per S. Scholfield.
Attorney

UNITED STATES PATENT OFFICE.

HAXHAM P. KENT, OF PROVIDENCE, RHODE ISLAND, ASSIGNOR TO HIMSELF AND THOMAS W. ROUNDS, OF SAME PLACE.

CHECK-REIN CLASP.

SPECIFICATION forming part of Letters Patent No. 316,370, dated April 21, 1885.

Application filed November 21, 1884. (No model.)

*To all whom it may concern:*

Be it known that I, HAXHAM P. KENT, of Providence, in the State of Rhode Island, have invented an Improvement in Check-Rein-Locking Clasps, of which the following is a specification.

The nature of my invention consists in an improved locking-clasp for securing the rear end of the check-rein to the water-hook of a harness, as hereinafter set forth; and the object of my invention is to provide a positive means for preventing the accidental detachment of the check-rein from the water-hook.

Figure 1:
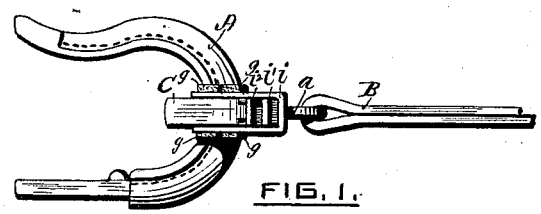
Figure 2:
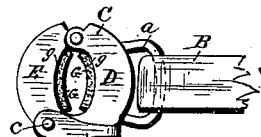
Figure 3:
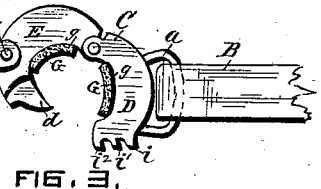
Figure 4:
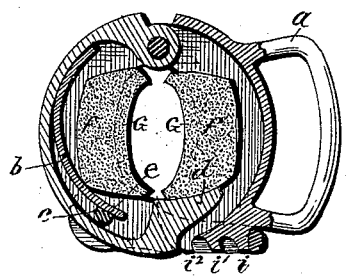
Figure 5:
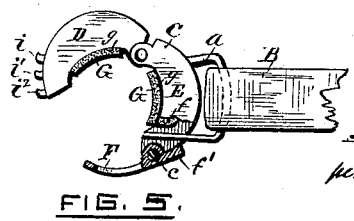

Figure 1 is a side elevation of the water-hook of a harness with my improved check-rein-locking clasp attached thereto. Fig. 2 is a plan view of the locking-clasp in its closed and locked condition. Fig. 3 is a plan view of the same when opened to receive the hook. Fig. 4 is a horizontal section showing the interior mechanism of the clasp. Fig. 5 shows a modification of my improvement.

In the accompanying drawings, A is the water-hook, which forms a portion of a harness. B is the rear end of the check-rein, to which is secured the locking-clasp C by means of the eye $a$, or other suitable device. The locking-clasp is composed of the hinged or pivoted jaws D and E, to one of which is pivoted the strap-hook F, which is adapted to hook over the end of the opposite jaw or over suitably-arranged projections upon the end portion of the jaw. The jaw E, to which the hook F is pivoted, is made hollow to receive a spring, $b$, as shown in Fig. 4. The pin $c$, which serves to pivot the hook F, and against which the spring $b$ presses, is cut away at the side $e$, and as the said pivot-pin is caused to move with the hook the spring $b$ will tend to hold the hook in the locking position, as shown in Fig. 2; but when the hook is thrown back so that the spring will be caused to rest against the rounded side of the pivot-pin the hook will be caused to rest in the position shown in Fig. 3. The jaw D is also preferably made hollow and adapted to receive the projecting tongue $d$ of the jaw E, which will serve to support and steady the locking ends of the jaws.

Within the hollow of the jaws, and projecting beyond the same, are placed the hook bearing-pieces G G, which are preferably made of rubber, but leather or other suitable material having a slight degree of elasticity may be employed; and I prefer to form the bearing-pieces G with an inwardly-directed shank, $f$, and having laterally-projecting flanges $g\,g$, the exposed portion of the bearing-piece being made to conform to the transverse sectional form of the hook.

The clasp may be properly secured to water-hooks of different thicknesses by catching the hook F over the projections $i$, $i'$, or $i^2$, as in any case required.

My improved clasp may be readily attached and removed from the water-hook by simply engaging or disengaging the hook F, the action of the spring $b$ serving to preserve the hook in its locking position.

A modification of my invention is shown in Fig. 5, in which the spring $b$ is omitted, the hook F being pivoted at $c$ and provided with an arm, $f'$, by means of which the disengagement of the hook may be effected, and which will serve as a stop for the outward movement of the hook, as shown in the figure. The elasticity of the bearing-pieces G G will suffice to hold the hook F in proper engagement with the projecting catches $i\,i'\,i^2$, as the case may be.

In Fig. 1 the hook F is shown in the form of a pivoted strap, whereas in Fig. 5 it is made from a perforated plate; but a piece of metal made in ordinary hook form is also employed in carrying out my invention, and either form may be employed, as preferred.

The bearing-pieces, which serve to provide an elastic bearing against the sides of the water-hook, may be made in any desirable form and of any material suitable for the purpose.

I claim as my invention—

1. In a check-rein-locking clasp, the combination of the hinged or pivoted jaws and means for locking the same in a holding position with the elastic bearing-pieces adapted to embrace the water-hook of a harness, substantially as described.

2. In a check-rein-locking clasp, the combination of the hinged or pivoted jaws, the bearing-pieces for the water-hook, the locking-hook pivoted to one of the jaws, and the spring adapted for holding the locking-hook in catch engagement with the opposite jaws of the clasp, substantially as described.

3. In a check-rein-locking clasp, the combination of the jaw E, provided with the pivoted hook F, with the jaw D, provided with two or more catch projections, whereby the clasp is adapted for water-hooks of different sizes, substantially as described.

HAXHAM P. KENT.

Witnesses:
SOCRATES SCHOLFIELD,
LEONARD SCHOLFIELD.